United States Patent
Latham et al.

(10) Patent No.: US 7,746,048 B2
(45) Date of Patent: Jun. 29, 2010

(54) NON-LINEAR PWM CONTROLLER FOR DC-TO-DC CONVERTERS

(75) Inventors: Paul Latham, Lee, NH (US); John C. Canfield, Newmarket, NH (US)

(73) Assignee: L&L Engineering, LLC, Lee, NH (US)

( * ) Notice: Subject to any disclaimer, the term of this patent is extended or adjusted under 35 U.S.C. 154(b) by 232 days.

(21) Appl. No.: 11/558,790

(22) Filed: Nov. 10, 2006

(65) Prior Publication Data

US 2007/0114985 A1    May 24, 2007

Related U.S. Application Data

(60) Provisional application No. 60/735,724, filed on Nov. 11, 2005.

(51) Int. Cl.
*G05F 1/00* (2006.01)
(52) U.S. Cl. ........................ 323/282; 323/284
(58) Field of Classification Search ............... 363/17; 323/283, 282, 284, 286, 222
See application file for complete search history.

(56) References Cited

U.S. PATENT DOCUMENTS

| | | | | |
|---|---|---|---|---|
| 5,808,879 | A | 9/1998 | Liu et al. | 363/17 |
| 6,906,931 | B1 | 6/2005 | Batarseh et al. | 363/17 |
| 6,940,733 | B2 | 9/2005 | Schie et al. | 363/21.12 |
| 7,358,706 | B2 * | 4/2008 | Lys | 323/222 |
| 7,499,894 | B2 * | 3/2009 | Marom et al. | 706/23 |
| 2004/0095020 | A1 | 5/2004 | Kernahan et al. | 307/35 |
| 2004/0104716 | A1 | 6/2004 | Marino et al. | 323/284 |
| 2005/0086058 | A1 * | 4/2005 | Lemelson et al. | 704/270 |
| 2005/0162144 | A1 * | 7/2005 | Kernahan | 323/300 |
| 2005/0212501 | A1 * | 9/2005 | Acatrinei | 323/283 |
| 2005/0285584 | A1 * | 12/2005 | Kwan | 323/283 |
| 2007/0063682 | A1 * | 3/2007 | Dagher | 323/282 |
| 2007/0112443 | A1 | 5/2007 | Latham et al. | 700/29 |

FOREIGN PATENT DOCUMENTS

WO    WO 2006/056918    6/2006

OTHER PUBLICATIONS

U.S. Appl. No. 60/735,724, filed Nov. 11, 2005.
Kelly, A. et al. Control of dc-dc converters by direct pole placement and adaptive feedforward gain adjustment. Applied Power Electronics Conference and Exposition, 2005. Twentieth Annual IEEE, vol. 3, Mar. 6-10, 2005, pp. 1970-1975.
Kelly, A. et al. High Resolution DPWM in a DC-DC Converter Application Using Digital Sigma-Delta Techniques. Power Electronics Specialists, 2005 IEEE 36th Conference on, Sep. 11-14, 2005, pp. 1458-1463.
Pun, L. Introduction to Optimization Practice, ISBN 471-70233-1, pp. 173-194.
De Russo, P.M. et al. State Variables for Engineers, John Wiley and Sons, New York, N.Y., 1965, pp. 575-577.
Mayne, D.Q. et al. Adaptive receding horizon control for constrained nonlinear systems, Proceedings of the 32nd IEEE Conference on Decision and Control, Date: Dec. 15-17, 1993, pp. 1286-1291, vol. 2.

(Continued)

*Primary Examiner*—Bao Q Vu
*Assistant Examiner*—Nguyen Tran

(57) ABSTRACT

A nonlinear PWM controller for switching power supplies.

16 Claims, 18 Drawing Sheets

OTHER PUBLICATIONS

Haykin, S. Introduction to Adaptive Filters, ISBN 0-02-949460-5, pp. 41-89, pp. 108-110, and pp. 139-143.

Sheingold, D. H. Nonlinear Circuit Handbook, published by Analog Devices, Inc. Norwood, Massachusetts, Chapter 2.

Dualibe, C. et al. Design of Analog Fuzzy Logic Controllers in CMOS Technologies Implementation, Test and Application, ISBN-10: 1-4020-7359-3.

International Search Report dated Mar. 28, 2008 for PCT/US06/60793 filed Nov. 10, 2006. Applicant: L&L Engineering LLC.

* cited by examiner

NON-LINEAR PWM CONTROLLER FOR DC-TO-DC CONVERTERS

CROSS REFERENCE TO RELATED APPLICATIONS

This application claims priority of U.S. Provisional Application 60/735,724 entitled "NON-LINEAR PWM CONTROLLER FOR DC TO DC CONVERTERS," filed on Nov. 11, 2005, which is incorporated by reference herein.

BACKGROUND

These teachings relates to switching converters, such as, dc to dc converters. These devices are used to efficiently transform to voltage and currents at on level to voltage and current of a different level. Switching converters are particularly important when either high power or battery operation require high efficiency. Switching converters are pervasive throughout many consumer products they are in almost every ball everyday items such as cell phones PDAs personal computers extra. A key feature of the DC to DC converters is its small size and low cost. This is achieved through efficient design.

DC to DC converters are used to convert an input DC voltage to an output DC voltage. Such converters may step down (buck) or step up (boost) the input DC voltage (buck-boost converters are also possible).

Conventional power supplies use Pulse Width Modulation (PWM) modulation to control the power devices used in converters. To minimize the size of the outage capacitors and improve the rejection of the output voltage to load current steps, it is desirable to have the feedback bandwidth in a DC-to-DC converter be as large as possible. This is typically achieved by designing a linear compensated control loop with a large bandwidth. Unfortunately, one of the limitations that occur is that with a normal pulse width modulated or PWM control system is that the duty cycle cannot be less than 0% and not be more than 100%. As a result, the control loop operates its desired linear form for small disturbances but for large disturbances the behavior is suboptimal and in some cases can even become unstable. The result of this is a deliberate reduction in the linear compensator bandwidth to accommodate the effect of finite control effort.

There is a need to provide a controller for switching converters that can operate well for large disturbances.

BRIEF SUMMARY

In one embodiment, the controller of these teachings includes a nonlinear controller component capable of providing a duty cycle to a pulse width modulator, the duty cycle corresponding at least one predetermining switching power supply state variable. The nonlinear controller component is operatively connected to receive as inputs at least one predetermined switching power supply state variable. A relationship between duty cycle and at least one predetermined switching power supply state variable is obtained by a predetermined method.

Other embodiments of the controller of these teachings are also disclosed including embodiments in which at least some of the internal states of the switching power supply are estimated.

Embodiments of the controlled switching power supply of these teachings are also disclosed.

For a better understanding of the present invention, together with other and further needs thereof, reference is made to the accompanying drawings and detailed description and its scope will be pointed out in the appended claims.

DETAILED DESCRIPTION

In one embodiment, the controller of these teachings includes a nonlinear controller component capable of providing a duty cycle to a pulse width modulator, the duty cycle corresponding at least one predetermining switching power supply state variable. The nonlinear controller component is operatively connected to receive as inputs at least one predetermined switching power supply state variable. A relationship between duty cycle and at least one predetermined switching power supply state variable is obtained by a predetermined method.

One embodiment of the nonlinear controller of these teachings provides optimum response for both large and small load disturbances. In one instance, an embodiment of the system utilizes dynamic programming (see, for example, L. Pun, *Introduction to Optimization Practice*, ISBN 471-70233-1, pp. 173-194 and De Russo, Roy, Close, *State Variables for Engineers*, John Wiley and Sons, new York, N.Y., 1965, pp. 575-577, both of which are incorporated by reference herein). It should be noted that these teachings are not limited to the use of dynamic programming. A variety of optimization techniques can also be utilized. For example, one technique which can be used is based on model predictive control; another is derived from techniques used for generalized optimization problems, such as genetic programming, simulated annealing, exhaustive numerical search, and neural networks, among others. With model predictive control, the controller starts at its current location and figures out the optimum trajectory up to some future time (see, for example, Mayne, D. Q.; Michalska, H, *Adaptive receding horizon control for constrained nonlinear systems*, Proceedings of the 32nd IEEE Conference on Decision and Control, 1993, Date: Dec. 15-17, 1993, Pages: 1286-1291 vol. 2, which is incorporated by reference herein). Using that trajectory, the system state at the next time step is computed, and the process repeated for every time step until the final time is reached.

In most optimization techniques, the optimization can be carried out subject to constraints. A number of practical constraints arise in the control and operation of switching power supplies. For example, constraints of maximum currents, output voltage tolerance arise in operation or design.

In one embodiment, one element of these teachings is the realization that the plant dynamics for switching (DC-to-DC) converters designed for high speed application have a very short transient time, are inherently discreet time, and are typically only second order. These observations, taken together, allow dynamic programming to be applied to PWM switching converters.

In one embodiment, the dynamic programming technique can provide the optimum duty cycle at every point in time. This is done by working backwards in time from the equilibrium point and at each time step determining the best possible trajectory to reach the equilibrium point.

Figure 1A:
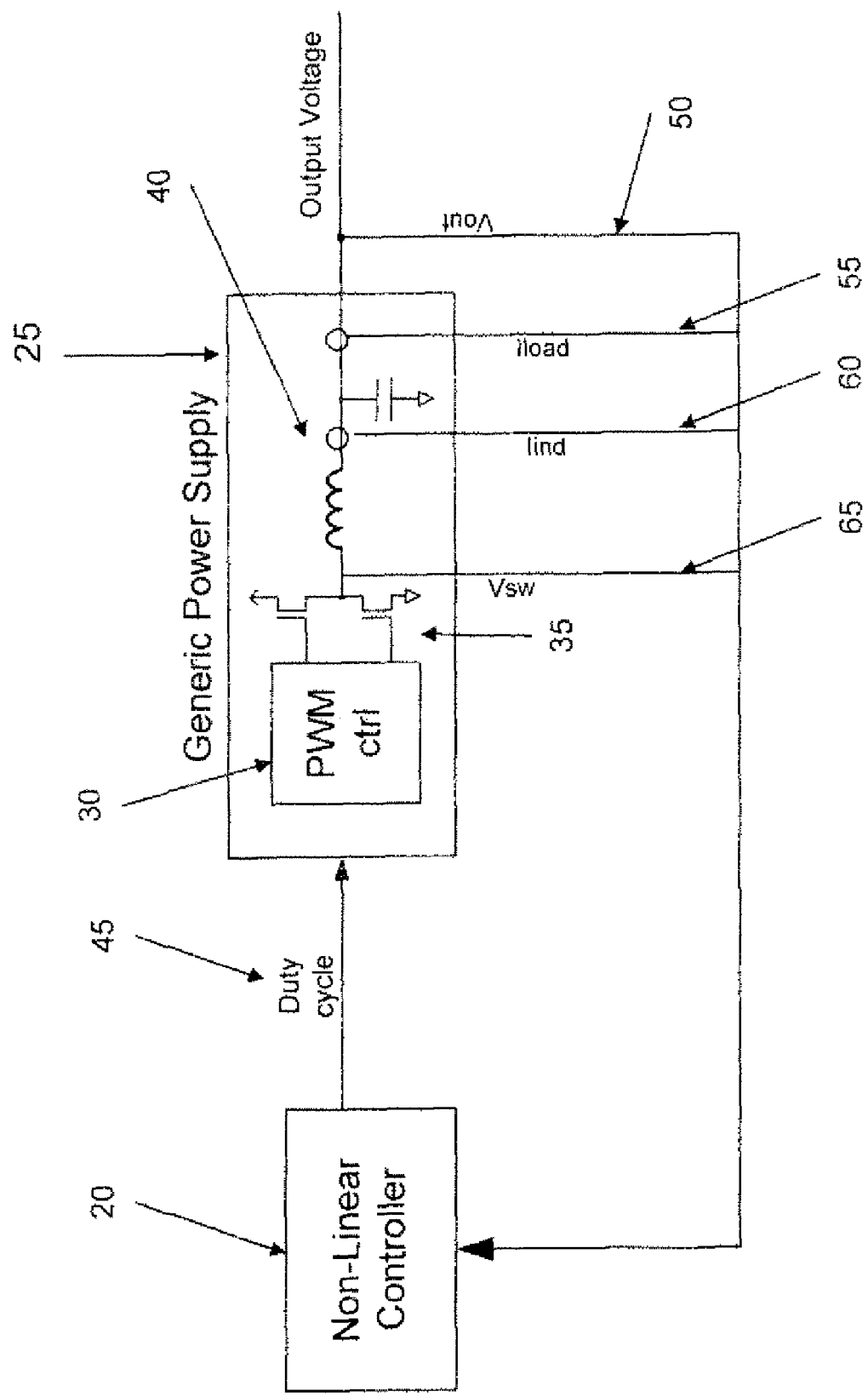
FIGS. 1a-1d show a graphical schematic representation an embodiment of the nonlinear PWM controller of these teachings.

FIG. 1a shows that an embodiment of the nonlinear PWM controller of these teachings. The switch and output voltages, combined with the inductor current and load current, are used to determine the correct duty cycle. The form of the nonlinear controller can be as simple as a lookup table or as complex as calculations done with the DSP. One exemplary analog embodiment includes a piece wise linear approximation using comparators. In one instance, the duty cycle is a static function of the state of the power supply.

Figure 2A:
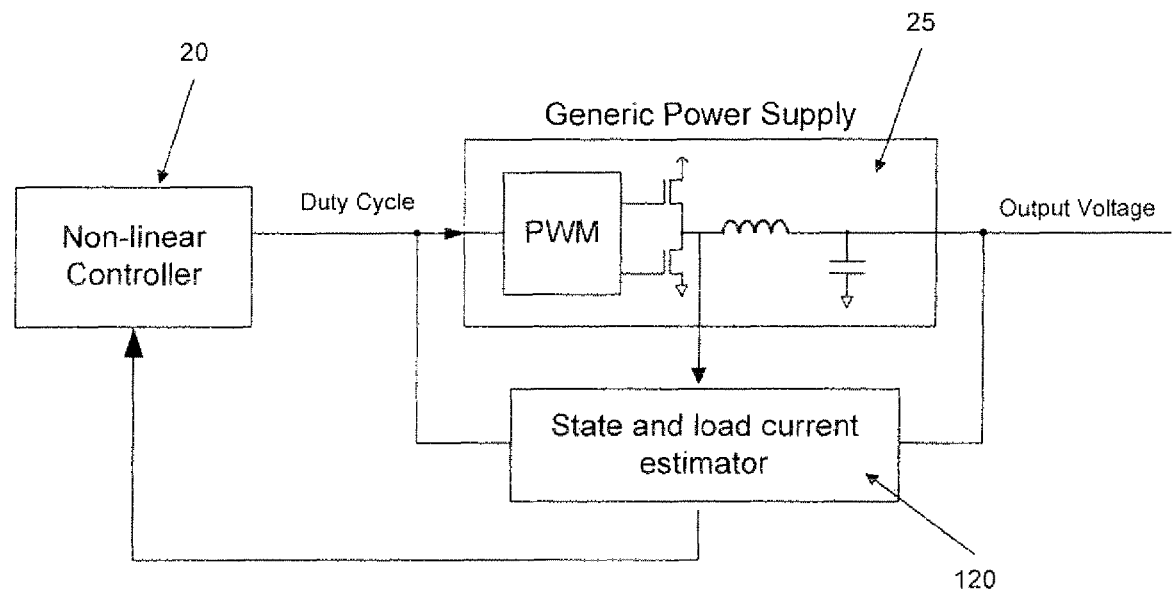
FIGS. 2a-2e show a graphical schematic representations of embodiments of the controller of these teachings including a state estimator.

In many applications it may not be desirable to have direct measurement of all these parameters, for example inductor and load currents. Instead it is desirable to use a load current estimator (see "US patent application 2007/0112443, corresponding to U.S. patent application Ser. No. 11/553,917, both of which are hereby incorporated by reference), to determine the missing state information. FIG. 2a is a pictorial representation of such a system. With this embodiment, the estimator is a dynamic system and the nonlinear controller is still just a static function of the measurements and estimates.

The proposed state estimator is designed (by traditional techniques, such as, but not limited, least squares estimators, Bayesian estimators or by the techniques described in US patent application 2007/0112443, corresponding to U.S. patent application Ser. No. 11/553,917, both of which are hereby incorporated by reference) with augmented states to estimate load current as well. An embodiment of the system of these teachings including a state estimator 120 is shown in FIG. 2a.

In some embodiments, the (adaptive in one embodiment) plant estimator component 120 utilizes the LMS algorithm in order to provide an estimate of the state variables of the Switching power supply 25. (For a description of the LMS algorithm, see for example, S. Haykin, *Introduction to Adaptive Filters*, ISBN 0-02-949460-5, pp. 108-110, which is incorporated by reference herein.). In other embodiments, the (adaptive) plant estimator component 120 utilizes and RLS algorithm (for a description of the RLS algorithm, see, for example, S. Haykin, *Introduction to Adaptive Filters*, ISBN 0-02-949460-5, pp. 139-143, which is incorporated by reference herein).

As disclosed in U.S. patent application Ser. No. 11/553, 917, in one embodiment, the controller of these teachings includes a sampling component capable of sampling an output signal from a system and an input signals from the system at a first sampling rate, the first sampling rate being at least equal to a predetermined operating rate, an input parameter obtaining component capable of receiving the output signal and the input signal sampled at the first sapling rate and of obtaining values for a plurality of input parameters, the values for the input parameters being sampled at the first sampling rate, a decimator component capable of receiving the values for the input parameters sampled at the first sampling rate and of providing subsampled values for the input parameters subsampled values being sampled at a second sampling rate, the second sampling rate been slower than the first sampling rate, an adaptive plant estimator component capable of receiving the subsampled values of the input parameters and of obtaining a model of the system, the model reflecting variations in the system.

As disclosed in U.S. patent application Ser. No. 11/553, 917, in another embodiment, the method of these teachings includes sampling an output signal from a system and an input signal from the system, obtaining, from the sampled output signal and the sampled input signal, values for a predetermined finite number of rows and columns from an inverse matrix and a predetermined finite number for a row vector in a least-squares solution, and obtaining, from the values for the predetermined finite number of rows and columns from an inverse matrix and the predetermined finite number for a row vector in a least-squares solution, a model for the system. Once a model of the system is obtained, an adaptive control method can be implemented.

Figure 2B:
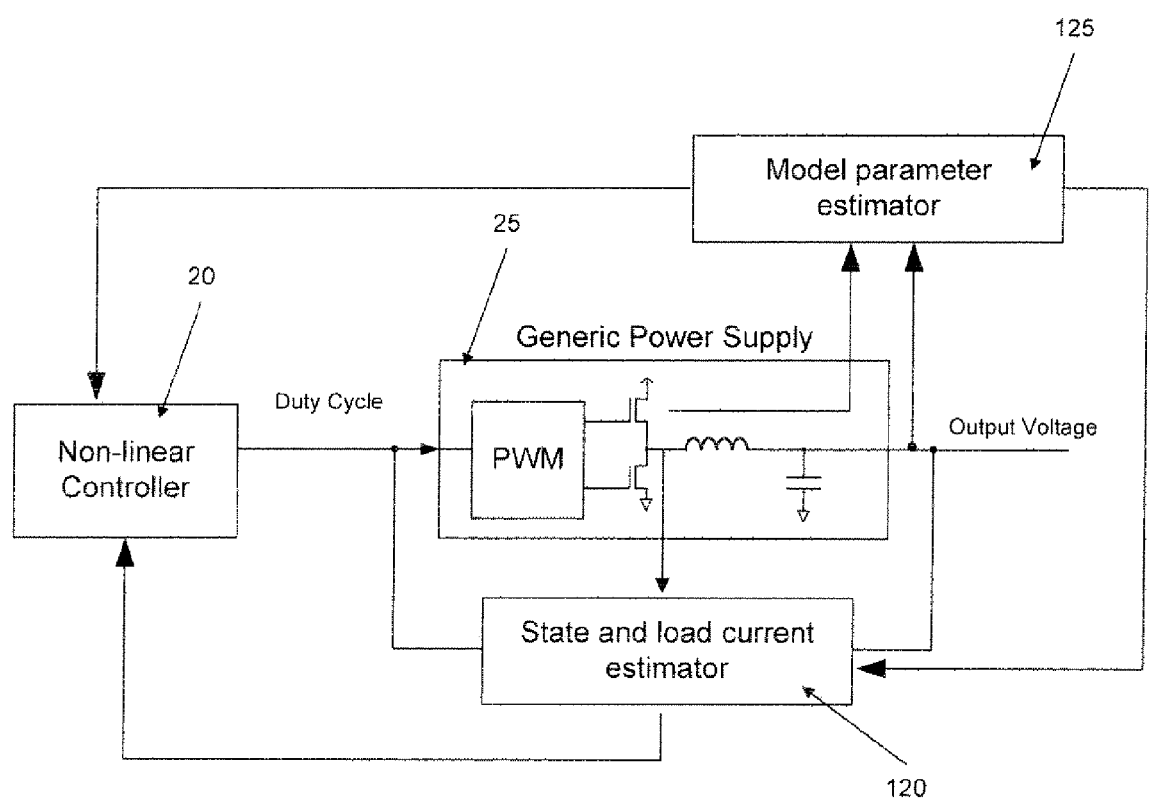

In one instance, shown in FIG. 2b, the model parameters could be estimated, by a model parameter estimator 125, along with the state and load current estimator 120.

As disclosed in U.S. patent application Ser. No. 11/553, 917, in one exemplary embodiment, these teachings not being limited to that exemplary embodiment, parameters of the system 25 (DC-to-DC power supply) vary slowly. Therefore it is possible to make the parameter updates a slower, offline computation. In a state estimator design, an analog-to-digital converter (ADC) measures the output and input (and intermediate in some embodiments) voltages in the power supply 25. The ADC results are also used by auto- and cross-correlators to measure the behavior of the power supply 25. The parameter computation are done offline at a lower sampling rate. This lowers the cost of those tasks, because the digital logic can be in the form of a simple micro-sequencer.

Figure 2C:
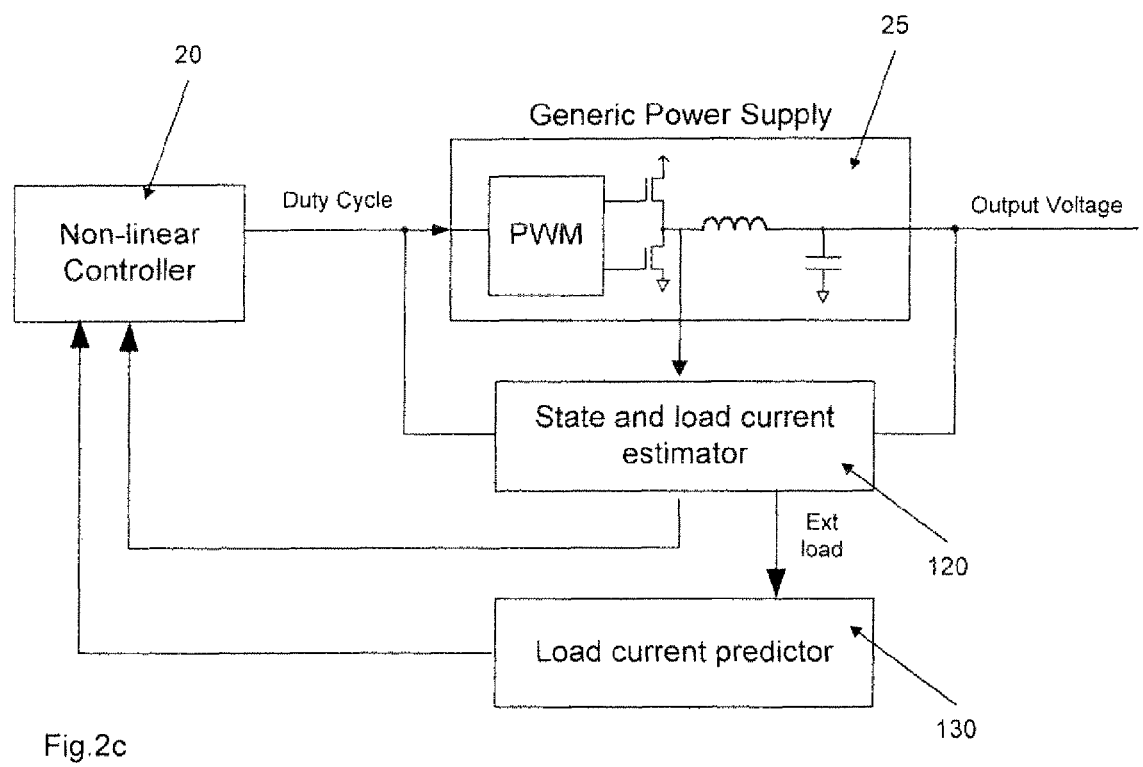

In another embodiment, shown in FIG. 2c, the controller of these teachings also includes a load current estimating component 120. As disclosed in U.S. patent application Ser. No. 11/553,917, in one embodiment, the load current estimating component is capable of receiving the output signal sampled at the first sampling rate and state estimation data from the (adaptive) plant estimator component and of providing estimated load current data at a first sampling rate and another decimator component capable of receiving the estimated load current data at the first sampling rate and of providing estimated load current data at the predetermined operating rate to the non-linear controller 20.

In one instance, As disclosed in U.S. patent application Ser. No. 11/553,917, the ADC is an oversampling ADC, a Delta Sigma ADC in one embodiment, including a an oversampling modulator, delta-sigma modulator in the above embodiment, and a decimation filter. The oversampling modulator converts the analog input voltage into a high-speed, digital bit stream. The digital bit stream may be as little as one bit wide. Because the digital bit stream is sampled at a very high rate, it is possible to low-pass filter the bit stream and to recover a high-precision, lower-sample-rate representation of the analog signal.

In one embodiments the sampling component is a oversampling (sigma delta in one embodiment) modulator and the first sampling rate is an oversampled rate. In one embodiment, the input parameter obtaining component is an autocorrelation and crosscorrelation estimator. It should be noted that other embodiments of the input parameter obtaining component are possible and within the scope of these teachings. It should also be noted that embodiments are possible in which the oversampling (sigma delta in one embodiment) modulator provides inputs to the state estimator and the load estimator.

In many applications, including the DC-to-DC converter application, and in particular for embodiments utilizing the cross- and autocorrelation functions, the decimation filter (decimator) function can be built-in. This reduces the cost because a one-bit multiplier is just a single gate, while a high-precision digital multiplier can be a costly design.

It should be noted that, although the embodiments shown above have not been explicitly adaptive, adaptive embodiments of the non-linear controller are possible and within the scope of these teachings. For example, once the states are estimated, as in FIGS. 2a and 2b, the cost function can be adapted to the identified states and the nonlinear controller can be an adaptive nonlinear controller. In the embodiment shown in FIG. 2e, the memory used is not a ROM but instead a RAM, which is altered by an adaptive component.

Figure 2D:
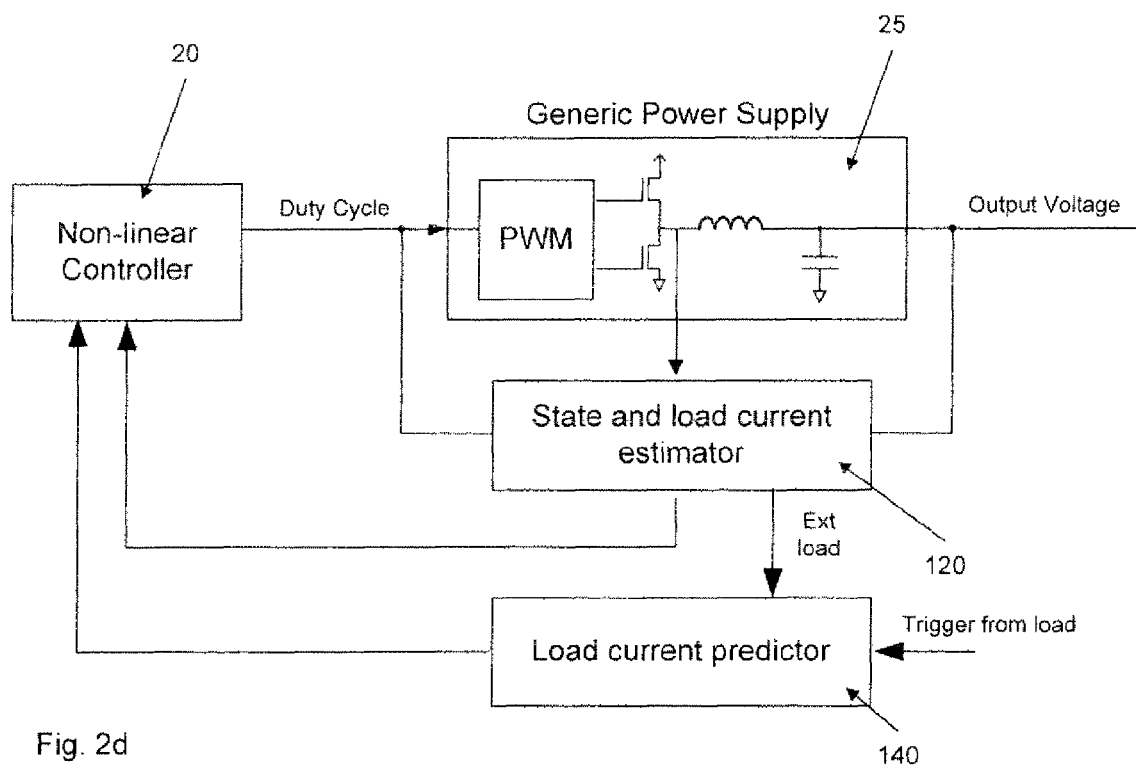
Figure 2E:
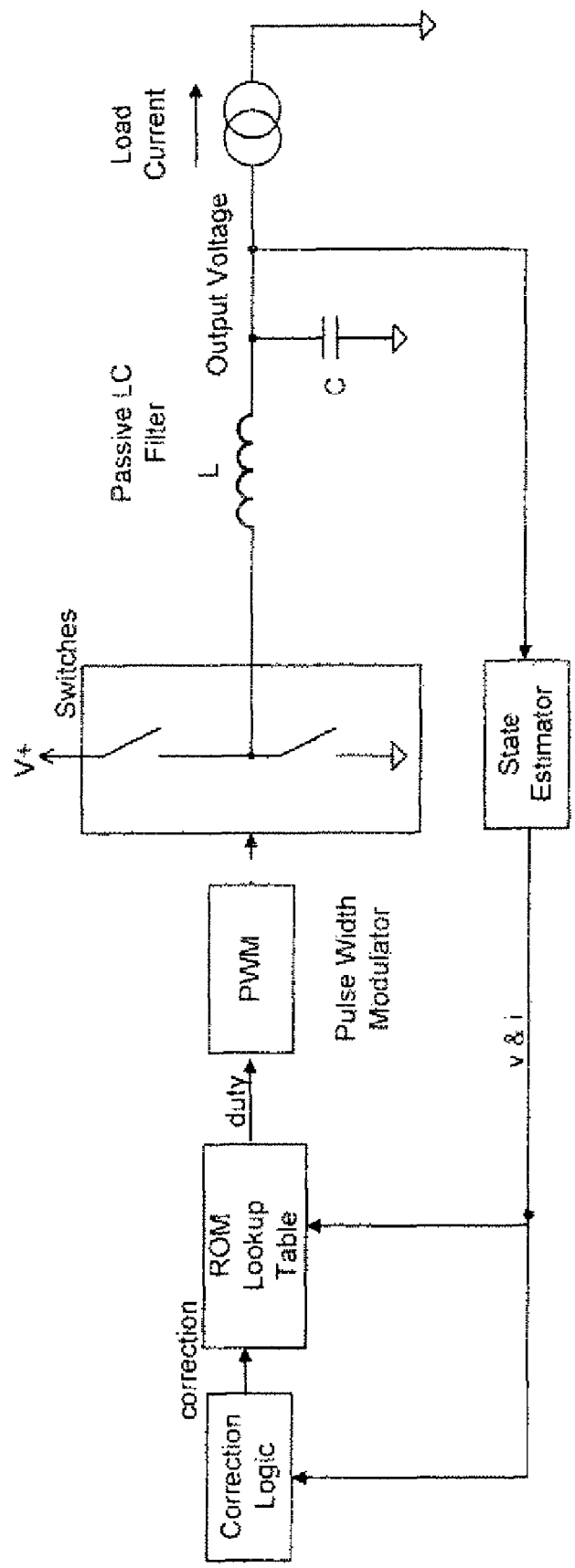
Figure 3:
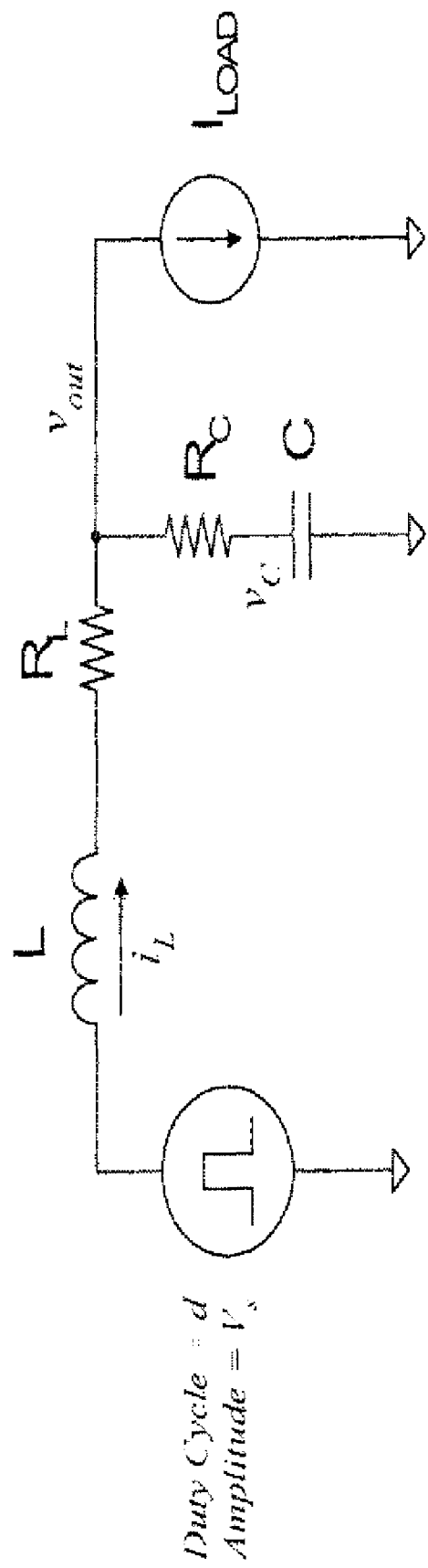
FIG. 3 shows a model of the buck regulator used in deriving one embodiment of the system of these teachings.

In the embodiment shown in FIG. 2e correction logic may be used to include the information gained from state estimation. The correction logic adjusts the RAM contents by measuring the error from the prediction of the current state based on the last state and the real measurement of the current state.

In a another embodiment, shown in FIG. 2c, the future load is predicted from the trends in the past load current by means of a load current predictor 130. This type of prediction can be done, in one instance, by a FIR or finite impulse response filter and, in another instance, by an infinite impulse response filter (or IIR filter). The filter coefficients could be determined, in one instance, by an LMS like algorithm and, in another instance, by an RLS like algorithm. It should be noted that these teachings are not limited to only those two algorithms. Other algorithms, such as, but not limited to, neural networks, can also be used for prediction. (See, for example, S. Haykin, *Introduction to Adaptive Filters*, ISBN 0-02-949460-5, pp. 41-89, which is incorporated by reference herein.)

In another instance, shown in FIG. 2d, information indicating that the load is about to have an abrupt change can be obtained. This input could be processed by a load curve predictor 140a. In one embodiment, the load current predictor is a nonlinear look up table In another embodiment techniques such as those described by John Canfield's Ph.D., thesis, Electrical Engineering, U.N.H, 2003, which is hereby incorporated by reference, our use. A nonlinear lookup table technique such as the cerrebular model articulation controller (CMAC) is used in one embodiment.

An exemplary embodiment is described below in order to better illustrate the system of these teachings. The exemplary embodiment uses a buck converter topology. However the methods of these teachings are applicable to any generic converter of buck, boost, or buck-boost, forward, fly-back, SEPIC, cuk, etc type.

In one embodiment, the resultant control law is implemented as a state-space static compensator described by a lookup table. This result provides a better understanding of the nature of the optimal control surface (e.g. degree of non-linearity, area of the map that is saturated) which is important in order to understand the representation requirements of an optimal compensator implementation.

The embodiment of the time-optimal compensator of these teachings derived below is based on the model of the buck regulator shown in FIG. 1a. It should be noted that this is not a limitation of these teachings and other regulators are within the scope of these teachings. The model is comprised of a linear LC filter which includes the effects of inductor and capacitor series resistances. It is important to note that the model could be easily extended to include other nonlinear effects (e.g. inductor saturation) and still be used directly in the design process described hereinbelow.

Referring to FIG. 1a, a nonlinear controller 20 provides a duty cycle 45 to a pulse width modulator (PWM) 30. The nonlinear controller 20 receives as inputs the output from a switching power supply 25 and a number of switching power supply internal state variables, for example, in the embodiment shown in FIG. 1a, the voltage at the inputs to the circuit including the two or more reactive components 65, Vsw, the current through the inductor 60, the load current 55 and the output voltage 50.

Figure 1B:
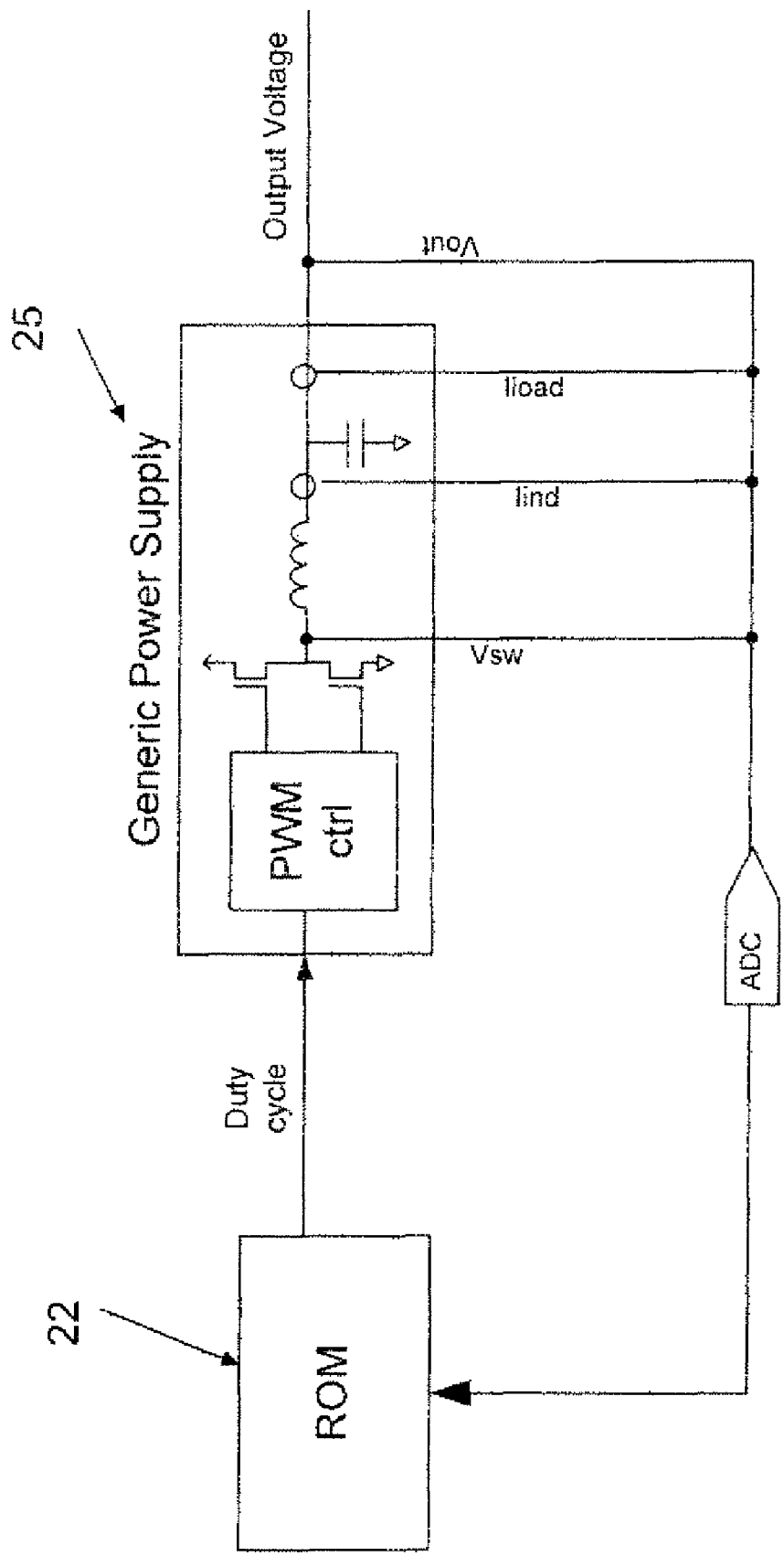

FIG. 1b depicts the embodiment in which the nonlinear controller is implemented as a memory 22 (a ROM in the instance shown). The memory is used to implement a lookup table (a data structure stored said memory, the data structure including a number of duty cycles, each duty cycle having one or more corresponding predetermined switching power supply state variables; each duty cycle, when provided to the PWM of the switching power supply, enables obtaining a predetermined switching power supply output.

Figure 1C:
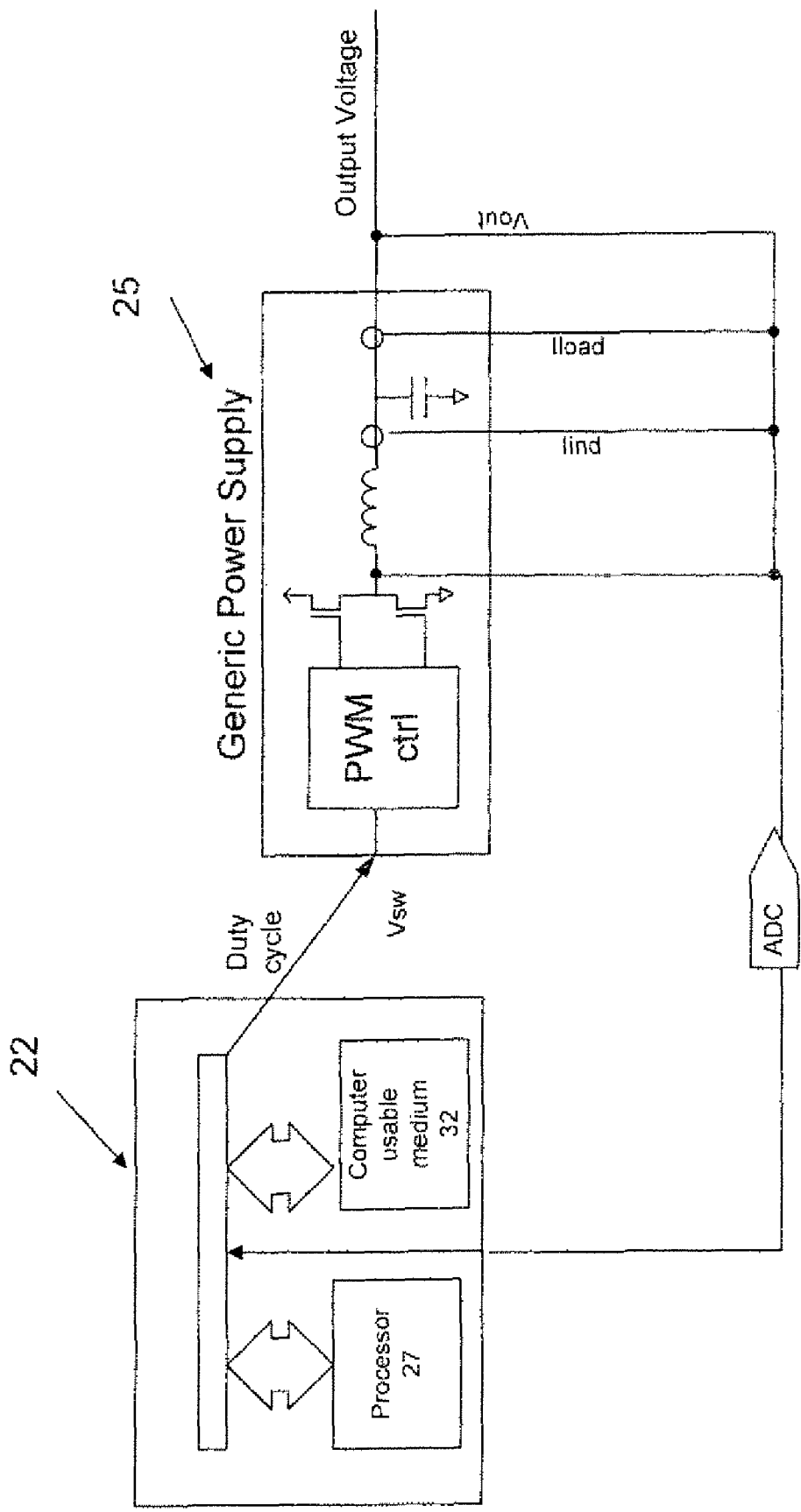
Figure 1D:
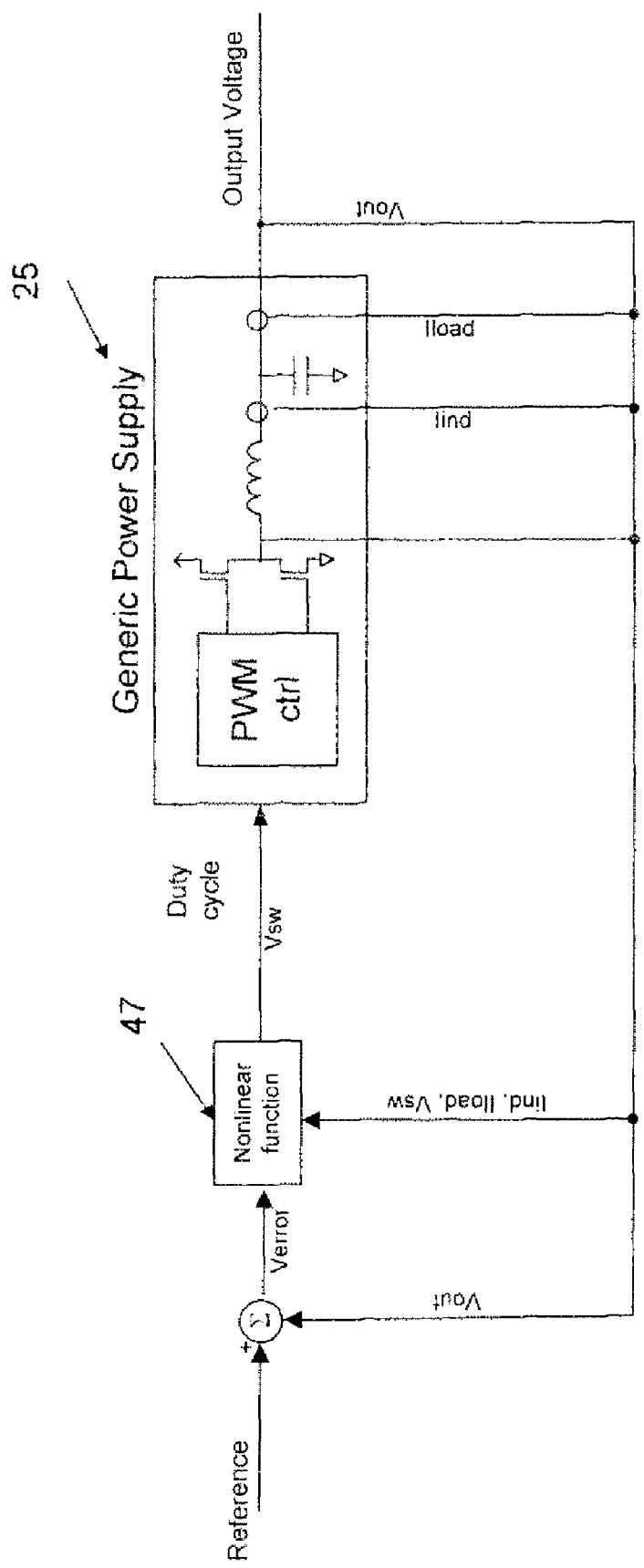
Figure 1E:
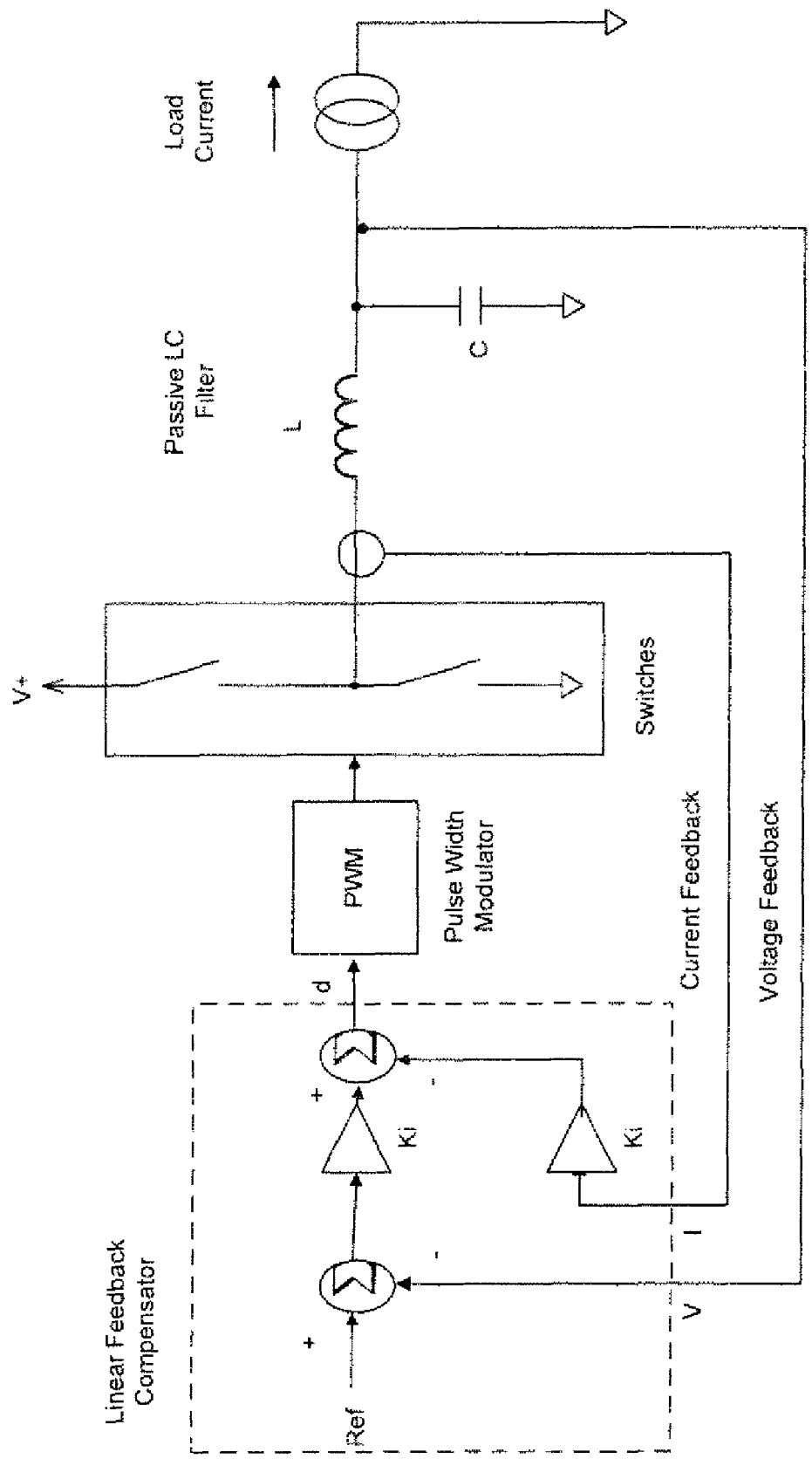
FIGS. 1e, 1f are block diagrams depicting a form of the conventional linear buck controller in ROM form.

To aid in better understanding the embodiment of the system of these teachings shown in FIG. 1b, an embodiment of a conventional linear controllers such as that of FIG. 1, is shown in FIG. 1e. A conventional linear controller for a buck converter (shown in FIG. 1) consists of feeding back an error signal that is composed of two components, as shown in FIG. 1e. The first component is a linear gain multiplied by the difference between the desired output voltage minus the measure output voltage. The second component is a gain multiplied by the inductor current. These two components are added together to form the duty cycle input to a pulse width modulator PWM. As an alternative, the derivative of the output voltage could be used instead of the inductor current. The voltage feedback provides for the correct regulations set point. The voltage feedback forces the output voltage toward the same value as a reference voltage. The current or voltage derivative feedback is used to stabilize the loop by adding phase lead to the feedback loop. In this way, the voltage gain can be larger while maintaining closed loop stability.

The equation that represents this linear feedback controller is simply:

$$d = Kv(\text{Ref} - V) - KiI$$

Figure 1F:
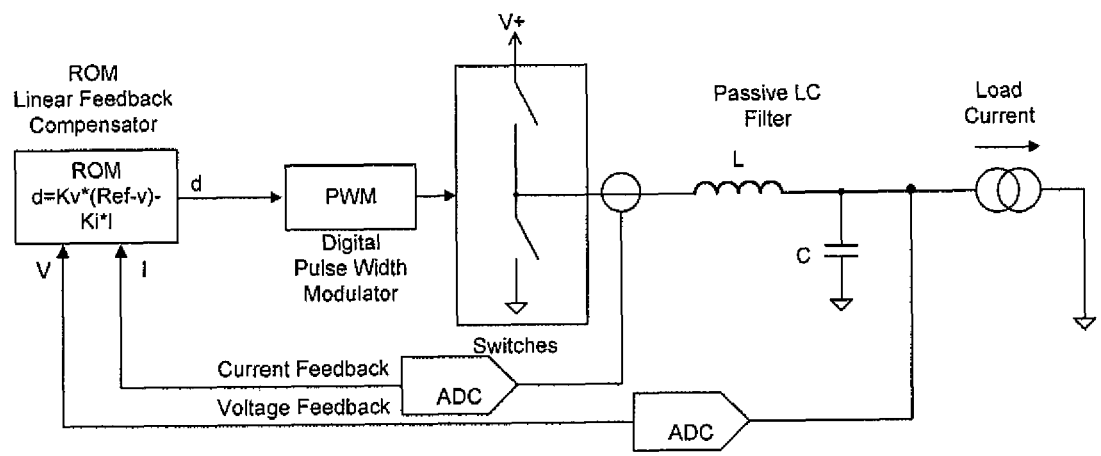

Where:
d is the duty cycle command to the PWM
V is the voltage feedback
I is the current feedback
Ref is the reference voltage
Kv is the voltage gain
Ki is the current feedback Instead of implementing this equation as an algebraic relationship, a read only memory, ROM, look up table could be used, as show in FIG. 1f. The analog representation of the voltage and current are converted to a digital representation by an analog to digital converter, ADC. The digital representation of the current and voltage is used to form the address to the memory. The output of the memory is used to control a digital PWM or a DAC driving a traditional analog PWM.

FIG. 1c depicts the embodiment in which the nonlinear controller is implemented as one or more processors 27 and one or more computer usable media 32 having computer readable code embodied therein that causes the processors 27 to obtain a duty cycle as described herein above. The processor 27, the one or more computer usable media 32 and the inputs are operatively connected by means of an interconnection component (such as a computer bus). In one instance, the one or more processors 27 and the one or more computer usable media 32 are part of a DSP.

FIG. 1d depicts the embodiment which the nonlinear controller is implemented as a piece wise linear approximation using a non-linear analog circuit 47 to determine the duty cycle. Many methods of implementing non-linear analog circuits (see, for example, Danial H. Sheingold, *Nonlinear Circuit Handbook*, published by Analog Devices, Inc. Norwood Mass., chapter 2 and, Dualibe, Carlos, Verleysen, M., Jespers, P, *Design of Analog Fuzzy Logic Controllers in CMOS Technologies Implementation, Test and Application*, ISBN-10: 1-4020-7359-3, both of which are incorporated by reference herein).

The equations describing this model can be easily formulated as a coupled set of linear differential equations. In state-space formulation these are given in equations (1) and (2). Notice that, in conventional systems it is customary to derive a simplified set of operational equations by assuming that Vout is constant across each PWM cycle.

$$\frac{d}{dt}\begin{bmatrix} i_L(t) \\ v_C(t) \end{bmatrix} = \begin{bmatrix} \frac{R_L + R_C}{L} & -\frac{1}{L} \\ \frac{1}{C} & 0 \end{bmatrix} \begin{bmatrix} i_L(t) \\ v_C(t) \end{bmatrix} + \begin{bmatrix} \frac{1}{L} & \frac{R_C}{L} \\ 0 & \frac{1}{C} \end{bmatrix} \begin{bmatrix} i_L(t) \\ v_C(t) \end{bmatrix} \quad (1)$$

$$= Ax(t) + Bu(t)$$

$$\begin{bmatrix} i_L(t) \\ v_C(t) \end{bmatrix} = \begin{bmatrix} 1 & 0 \\ R_C & 1 \end{bmatrix} \begin{bmatrix} i_L(t) \\ v_C(t) \end{bmatrix} + [0] \begin{bmatrix} i_L(t) \\ v_C(t) \end{bmatrix} \quad (2)$$

$$= Cx(t)$$

Considering a single PWM cycle, the state equations can be written as shown in equations (3) and (4) where the state-space trajectory is given by the sum of the natural exponential response and the convolution of the state transition matrix and the input vector.

$$\begin{bmatrix} i_L(t_0 + t) \\ v_C(t_0 + T) \end{bmatrix} = e^{AT} \begin{bmatrix} i_L(t_0) \\ v_C(t_0) \end{bmatrix} + \int_{t_0}^{t_0+T} e^{A(t-t_0)} Bu(t) dt \quad (3)$$

$$u(t) = \begin{bmatrix} V_S(u(t_0) + u(dt)) \\ I_{out}(t) \end{bmatrix} \quad (4)$$

The fundamental significance of this result is that it provides a means of predicting the state variables (inductor current and output voltage) at the end of the PWM cycle as a function of the initial state variables, the duty cycle, and the fixed parameters as given by equation (5). Two techniques for solving (5) numerically have been utilized. However, it should be noted that these teachings are not limited to only these two techniques. In one instance the solution is found via numerical integration of equations (3) and (4). Alternatively, in another instance, one can create an equivalent discrete time system with a sample time equivalent to the PWM rate which is valid for a given duty cycle command. The discrete time model can then be used to predict the state variables at the end of the PWM cycle. The numerical integration technique was computationally more efficient but both methods yielded identical results.

$$\begin{bmatrix} i_L(t_0 + t) \\ v_C(t_0 + T) \end{bmatrix} = f(i_L(t_0), v_C(t_0), R_C, R_L, V_S, I_{out}, C, L, d) \quad (5)$$

The exemplary embodiment shown hereinbelow utilizes dynamic programming. (However, it should be noted that these teachings are not limited to only this exemplary embodiment.) Dynamic programming is an optimization technique based on the Bellman Optimality Principle which, in essence, states that the optimal path from any intermediate state to some final state is independent of the control decisions which occurred prior to entering the intermediate state. The practical significance of the Bellman Principle is that it allows one to work backwards in time to consider the optimal path to the final state. This results in a drastic reduction in required computation. The dynamic programming task as implemented here can be divided into the following four steps:

Quantization of State-space and Control Input

Construction of State Transition Map

Construction of Global Cost Function

Derivation of Optimal Control Surface

In order to implement a dynamic programming solution, it is necessary to quantize the state-space and control variables in both amplitude and time. The time quantization is selected to coincide with the PWM cycle.

The State Transition Map is a three dimensional mapping as defined by the solution to equation (5). The state transition map predicts the next quantized state as a function of the previous quantized state for all permissible duty cycle commands. Thus, the state transition map is a lookup table with dimensions Ni×Nv×Nd. The state transition map is computed by exhaustively filling the table based on numerical solution of equation (5). Values of commanded duty cycle which result in a next state outside the bounds of the defined state-space are marked as illegal controls for that state.

The Global Cost Function is a scalar valued function defined over the state-space. It provides the "cost" to transition from that state to the final target state (this is often referred to as the "cost-to-go"). In order to determine the global cost function it is necessary to provide a local cost function which appropriately penalizes each transition based on a function of the state and control input as shown in equation (6) where x(k) represents the state vector and u(k) represents the input vector.

$$J(x_0) = \sum_{k=0}^{M} L(u(k), x(k)) + \phi(N, x_N) \quad (6)$$

In the embodiment described hereinbelow, the cost function defined in equation (7) is used. The primary weighting provided by this cost function is on the number of steps taken to reach the desired target state. This corresponds to the time-optimal control and is represented in the cost function as the path cost M. There is an additional weighting placed on the error in the voltage state variable. The parameter α is chosen such that the voltage error weighting is much less than 1.0 for any location in state-space. This choice of parameter results in a primary weighting based on the number of steps in the trajectory, and a tie-breaking secondary weighting based on the voltage error. For example, if there are two paths that result in a total trajectory containing an equal number of steps, the voltage error weighting will result in the one with a smaller voltage excursion being chosen as the overall optimal path. However, a suboptimal time path will never be chosen to reduce the voltage excursion.

$$J(\hat{v}_0, \hat{i}_L) = \alpha \sum_{k=0}^{M} (v_0[k] - v_{target})^2 + M \qquad (7)$$

The global cost function is represented with the syntax given in equation (7) where M represents the number of time steps in the optimal path beginning at state $(\hat{v}_o, \hat{i}_L)$. The global cost function represents the total cost associated with beginning at state $(\hat{v}_o, \hat{i}_L)$ and ending in the target state. The global cost function is computed using the state transition map, the cost function (7) and the Bellman Principle according to the following algorithm:

Initialize the Global Cost Function by letting J($\hat{v}_{target}, \hat{i}_{target}$)=0 and J($\hat{v}_o, \hat{i}_L$)=¥ for all other points in the quantized state-space. That is, there is zero error associated with being in the target state and all other points are initialized to an infinite cost.

For each discrete point $(\hat{v}_0, \hat{i}_L)$ in the state-space:

2a. For each possible control input di (quantized duty cycle):
  2a'. Determine the next state $(\hat{v}_{0n}, \hat{i}_{Ln})$ from the state transition map
  2a". Determine the experimental cost $J_i = J(\hat{v}_{0n}, \hat{i}_{Ln}) + (\hat{v}_0 - v_{target})^2$ 2b. Let $J(\hat{v}_0, \hat{i}_L)$=min J 2c. Let $U_{opt}(\hat{v}_o, \hat{i}_L) = d_{min}$ 3. If any values in the Global Cost Function changed value then repeat step 2.

Figure 4:
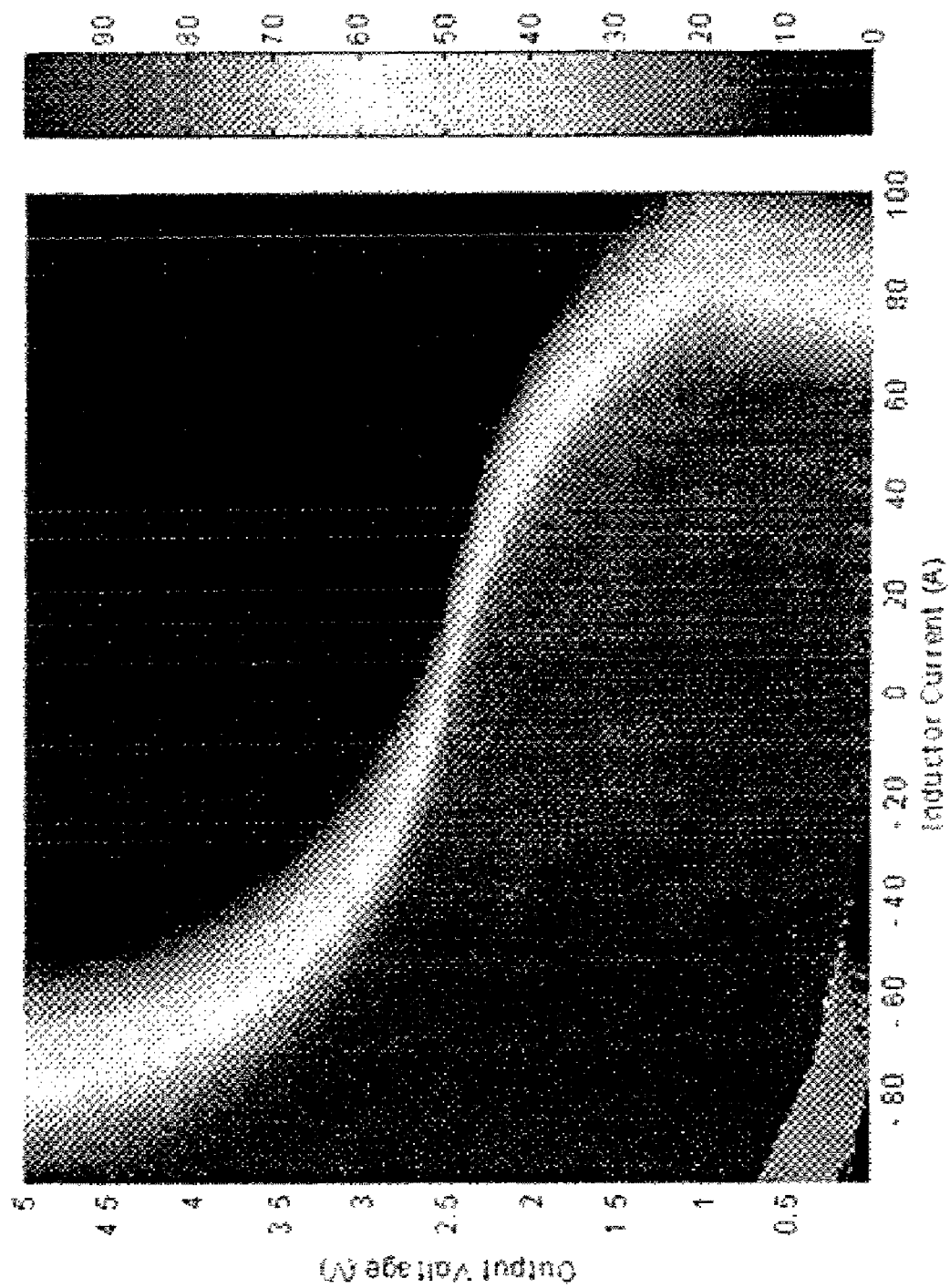
FIG. 4 depicts a optimal control surface over the state-space for an embodiment of the controller of these teachings.

FIG. 4 depicts the above derived optimal control surface over the state-space. In this case, the state-space was quantized to 200 levels in each variable and the duty cycle was quantized to 100 levels. The target voltage and current were chosen to be 2.5V and 10 A respectively. Notice that over most of the state-space, the optimal control is saturated near full or zero duty cycle and only assumes intermediate values over a small transition band. This transition band corresponds to the switching curve of a time-optimal controller. The region of low duty cycles in the lower left hand corner is due to the fact that these are unreachable states and in reality, these should be arbitrarily set to be full duty cycle. Also, the map shown here was filtered using a two-dimensional, nonlinear median filter. The edge effects of this filtering create artifacts that are visible along the boundaries of the image.

Figure 5:
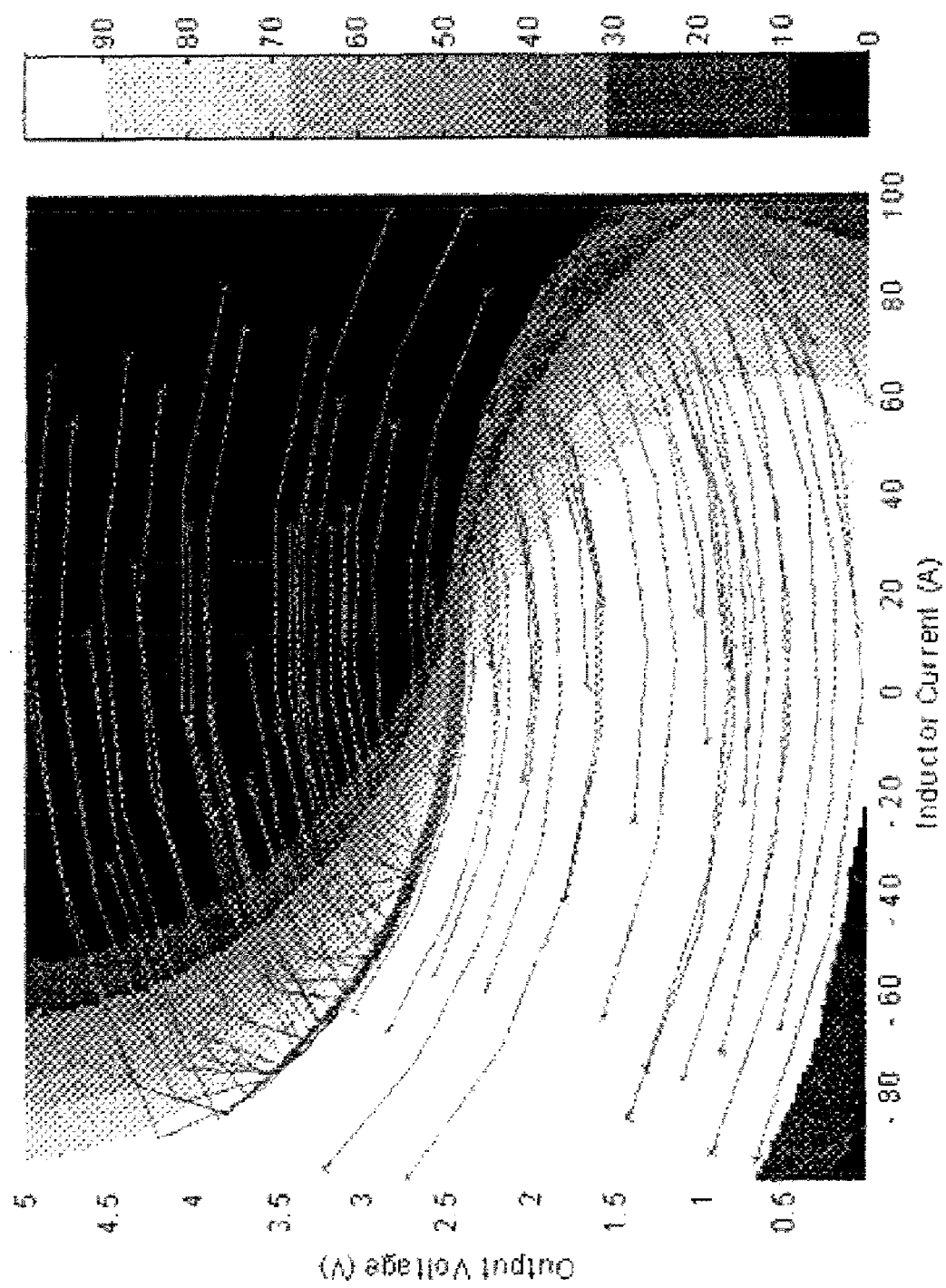
FIG. 5 depicts the optimal control surface of an embodiment of the controller of these teachings as a gray-scale image mapped over state-space.

It is informative to compare this optimal control surface with a time optimal control surface for a continuous-state, continuous-time plant. In that case, it is known that the optimal control is always saturated at its extremes and the controller can be completely described by switching curves which partition the state-space into regions of maximum control effort and minimum control effort (commonly referred to as "bang-bang" control). In this case, the time optimal solution contains intermediate controls along the pseudo-switching curve. The reason for this is due to the time quantization involved in the PWM problem. The time-optimal bang-bang control is only the optimal solution if the switching times are allowed to be arbitrary. In the case of a PWM controller, only control decisions at the PWM interval boundaries can be made. Therefore, when the state is close to the final state, the optimal control assumes the appropriate intermediate value to accommodate the time quantization. FIG. 5 depicts the optimal control surface as a gray-scale image mapped over state-space. The duty cycle is in percentage from 0 to 100%. Overlaid on the image are a series of 100 optimal trajectories beginning at random initial conditions in state-space.

Figure 6:
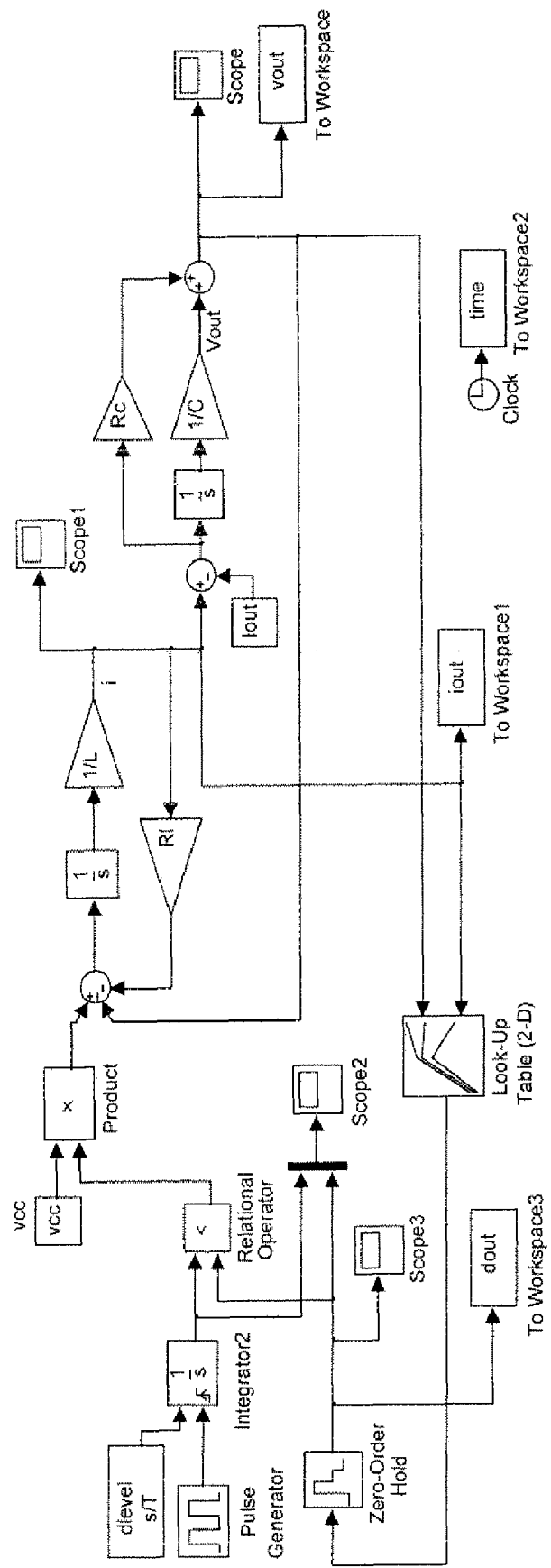
FIG. 6 shows the block diagram used in a simulation of an embodiment of the controller of these teachings.

This implementation of the embodiment of time-optimal controller described above is represented in a closed loop simulation of the buck converter. The simulation uses the block diagram shown in FIG. 6. The optimal controller is implemented as an interpolated lookup table based on the optimal control surface previously developed. A zero order hold is utilized to maintain the value of the lookup table as a constant across each PWM cycle.

This implementation of the above derived embodiment of the time-optimal controller of these teachings in a closed loop simulation of the buck converter is shown below. The simulation uses the block diagram shown in the following diagram. The optimal controller is implemented as an interpolated lookup table based on the optimal control surface previously developed. A zero order hold is utilized to maintain the value of the lookup table as a constant across each PWM cycle.

Figure 7A:
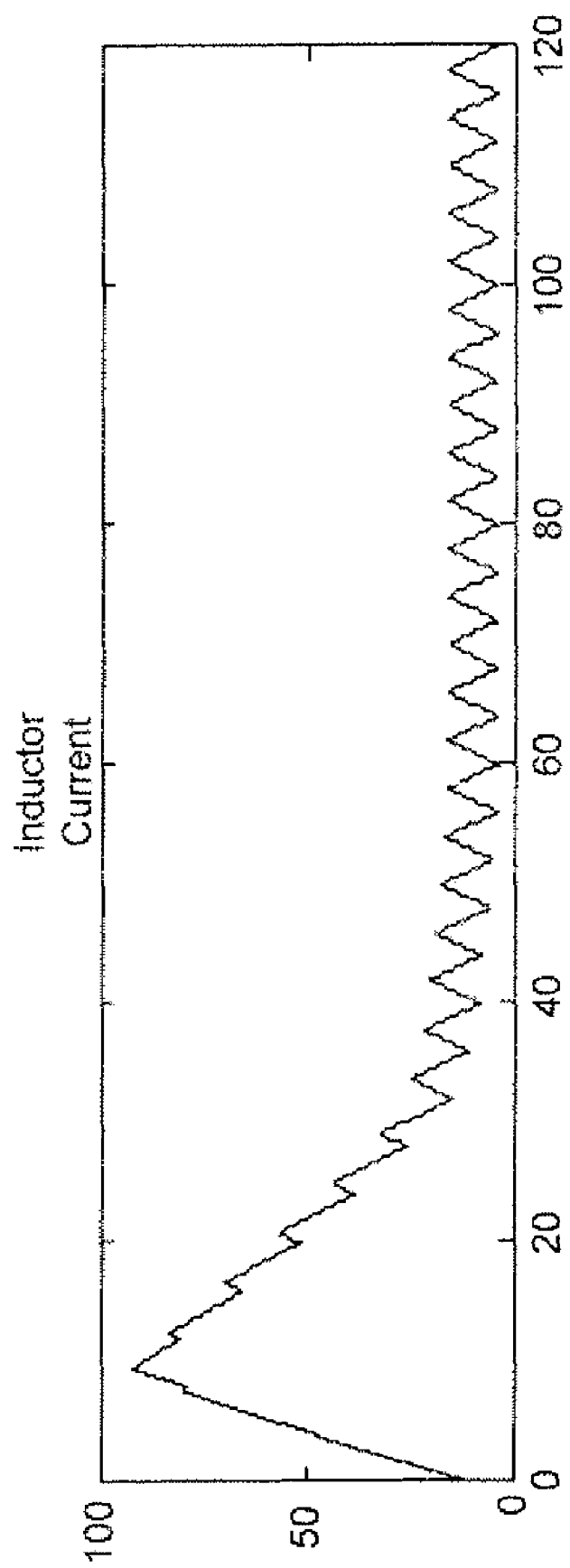
FIGS. 7a, 7b and 7c show a typical closed loop transient response for the above derived embodiment of the time-optimal controller of these teachings.
Figure 7B:
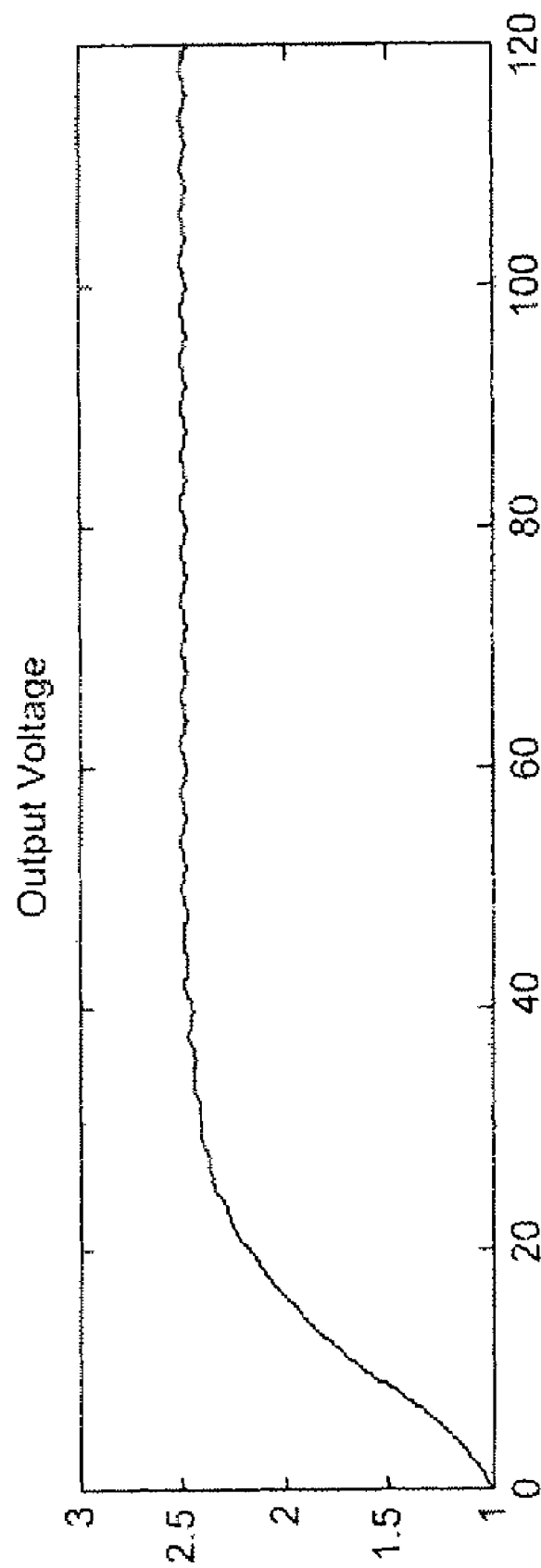
Figure 7C:
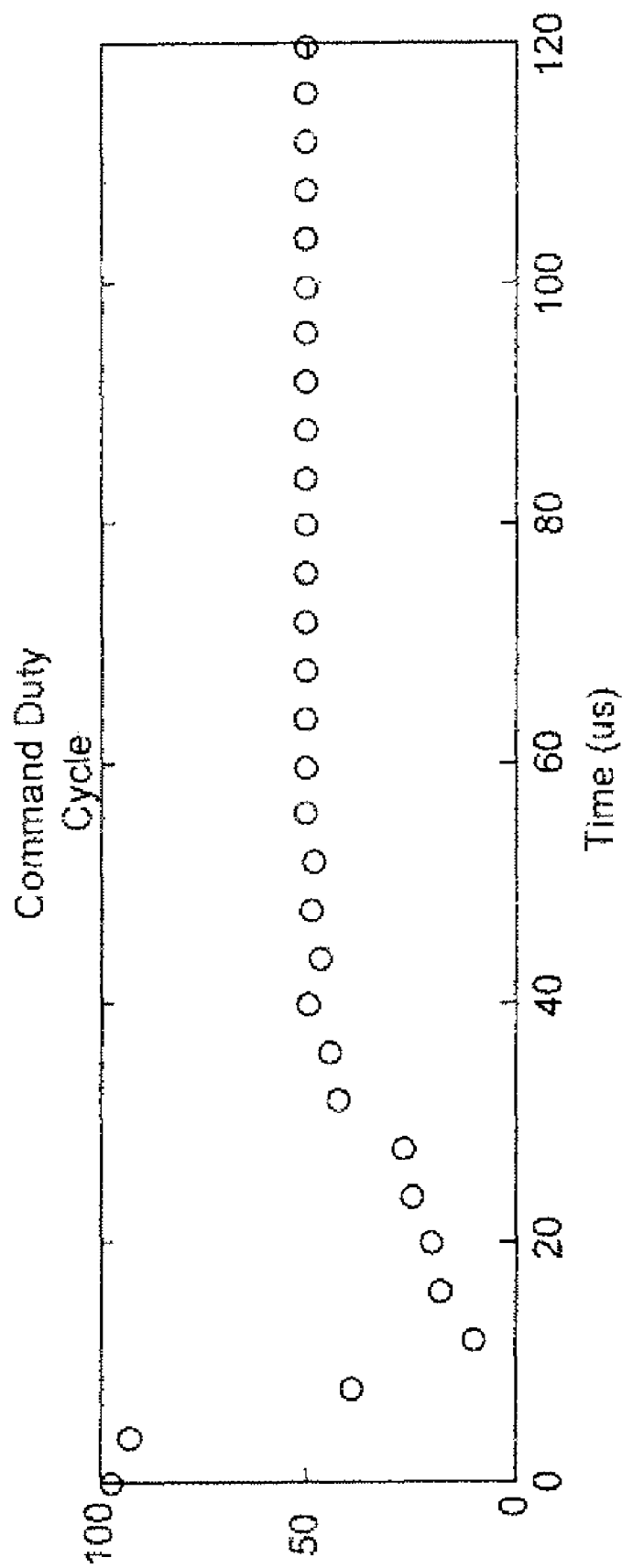

FIGS. 7a, 7b and 7c show a typical closed loop transient response for the above derived embodiment of the time-optimal controller of these teachings. In this case, the output voltage starts low. The characteristic response is a sharp increase in inductor current followed by a sharp decrease in inductor current. This current pulse provides the charge required to increase the output capacitor to its target value.

Although the invention has been described with respect to various embodiments it should be realized these teachings is also capable of a wide variety of further and other embodiments within the spirit and scope of the appended claims.

What is claimed is:

1. A controller for switching power supplies, the controller comprising:
   a nonlinear controller component providing a duty cycle to a pulse width modulator, said duty cycle corresponding to at least one predetermined switching power supply state variable;
   said nonlinear controller component being operatively connected to receive as inputs at least one predetermined switching power supply state variable;
   a relationship between duty cycle and at least one predetermined switching power supply state variable being obtained by a predetermined method; said predetermined method comprising optimizing a predetermined function of said duty cycle and internal states; said predetermined function assigning a cost to each transition from a state to a final target state based on a function of said duty cycle and internal states.

2. The controller of claim 1 wherein said relationship is obtained by minimizing said predetermined function utilizing dynamic programming.

3. The controller of claim 1 wherein said predetermined function is subject to at least one constraint.

4. The controller of claim 1 wherein said relationship is obtained by minimizing said predetermined function utilizing optimization techniques.

5. The controller of claim 1 further comprising:
   a state estimation component receiving an output voltage and an input to a switching power supply and of providing an estimate of states in a state model of the switching power supply and an estimate of a load current of said switching power supply.

6. The controller of claim 5 further comprising:
   a load current predictor receiving an estimate of present load current from said state estimator component; said load current predictor being predicting a future load current value.

7. The controller of claim 6 wherein said load current predictor comprises a digital filter.

8. The controller of claim 7 wherein said digital filter is a finite impulse response filter.

9. The controller of claim 7 wherein said digital filter is an infinite impulse response filter.

10. The controller of claim 7 wherein filter coefficients of said filter are determined by an RLS type algorithm.

11. The controller of claim 7 wherein filter coefficients of said filter are determined by an RLS type algorithm.

12. The controller of claim 6 wherein said load current predictor receives an input signal indicating future occurrence of a sudden change in load; said load current predictor predicting the future load current value after occurrence of the sudden change in load.

13. The controller of claim 12 wherein said load current predictor utilizes a nonlinear lookup table.

14. The controller of claim 13 wherein said nonlinear lookup table is implemented by means of a neural network.

15. The controller of claim 1 wherein said nonlinear controller component comprises:
a plurality of comparators, said plurality of comparators operatively connected to provide a substantially piecewise linear approximation to said relationship between duty cycle and at least one predetermined switching power supply state variable.

16. A system for controlling a switching power supply, the system comprising:
means for minimizing a function of switching states and internal states of the switching power supply; said function assigning a cost to each transition from a switching state to a final target switching state;
means for obtaining, from said minimizing, the relationship between duty cycle and at least one predetermined switching power supply state variable; and
means for providing a duty cycle to a pulse width modulator in the switching power supply.

* * * * *

UNITED STATES PATENT AND TRADEMARK OFFICE
CERTIFICATE OF CORRECTION

PATENT NO. : 7,746,048 B2
APPLICATION NO. : 11/558790
DATED : June 29, 2010
INVENTOR(S) : Latham et al.

It is certified that error appears in the above-identified patent and that said Letters Patent is hereby corrected as shown below:

| | |
|---|---|
| Column 1, Line 14 | Delete "relates" and insert --relate-- |
| Column 2, Line 6 | Insert --of-- after "representation" |
| Column 2, Line 10 | Delete "form:" and insert --form;-- |
| Column 2, Line 11 | Delete "a" after "show" |
| Column 2, Line 16 | Delete "a" and insert --an-- |
| Column 2, Line 46 | Delete "new York" and insert --New York-- |
| Column 3, Line 15 | Delete "that" after "shows" |
| Column 3, Line 50 | Delete "utilizes and" and insert --utilizes an-- |
| Column 3, Line 58 | Delete "signals" and insert --signal-- |
| Column 3, Line 62 | Delete "sapling" and insert --sampling-- |
| Column 4, Line 2 | Delete "been" and insert --being-- |
| Column 4, Line 33 | Delete "computation" and insert --computations-- |
| Column 4, Line 48 | Delete "As" and insert --as-- |
| Column 4, Line 51 | Delete "including a an" and insert --including an-- |
| Column 4, Line 60 | Delete "is a" and insert --is an-- |
| Column 5, Line 23 | Delete "a" after "In" |
| Column 5, Line 41 | Insert --.-- after "table" |
| Column 6, Line 15 | Delete "table (a" and insert --table a-- |
| Column 6, Line 22 | Delete "of a" and insert --of-- |
| Column 9, Line 27 | Delete "min J" and insert -- $\min_i J_i$ -- |
| Column 11, Line 6 | Delete "RLS" and insert --LMS-- |

Signed and Sealed this

Sixteenth Day of November, 2010

David J. Kappos
*Director of the United States Patent and Trademark Office*